(12) United States Patent
Carapic et al.

(10) Patent No.: US 12,333,094 B1
(45) Date of Patent: Jun. 17, 2025

(54) MECHANICAL FLEXURAL PARALLEL MOTION TRACKPAD

(71) Applicant: Microsoft Technology Licensing, LLC, Redmond, WA (US)

(72) Inventors: Vladimir Carapic, Belgrade (RS); Srdjan Jovanovic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/662,449

(22) Filed: May 13, 2024

Related U.S. Application Data

(60) Provisional application No. 63/574,658, filed on Apr. 4, 2024.

(51) Int. Cl.
  *G06F 3/041* (2006.01)
  *G06F 3/0354* (2013.01)

(52) U.S. Cl.
  CPC .................. *G06F 3/03547* (2013.01)

(58) Field of Classification Search
  CPC ... G06F 3/021; G06F 3/03547; G06F 3/04886
  See application file for complete search history.

(56) References Cited

U.S. PATENT DOCUMENTS

| | | | | |
|---|---|---|---|---|
| 8,860,671 B2 * | 10/2014 | Jung | .................. | G06F 3/03547 345/173 |
| 9,921,692 B2 * | 3/2018 | Tan | ....................... | G06F 3/0393 |
| 10,331,265 B2 * | 6/2019 | Rosenberg | .......... | G06F 3/03543 |
| 10,564,839 B2 * | 2/2020 | Rosenberg | .......... | G06F 3/04883 |
| 11,429,157 B2 * | 8/2022 | Degner | ............... | G06F 3/04883 |
| 11,720,176 B2 * | 8/2023 | Ligtenberg | ........... | H03K 17/943 345/173 |
| 2011/0227872 A1 | 9/2011 | Huska et al. | | |
| 2012/0103773 A1 * | 5/2012 | Villain | ................ | G06F 3/03547 200/344 |
| 2014/0034468 A1 | 2/2014 | Krumpelman et al. | | |
| 2014/0111914 A1 * | 4/2014 | Leggett | .................. | H01H 11/00 361/679.1 |
| 2015/0185769 A1 * | 7/2015 | Takata | .................... | G06F 1/169 345/173 |
| 2015/0293617 A1 | 10/2015 | Clayton | | |
| 2017/0322591 A1 * | 11/2017 | Lee | ......................... | G06F 1/169 |
| 2017/0329426 A1 | 11/2017 | Han | | |
| 2019/0073036 A1 | 3/2019 | Bernstein | | |
| 2019/0348983 A1 * | 11/2019 | Edgar | ................... | G06F 1/1679 |

* cited by examiner

*Primary Examiner* — Joe H Cheng
(74) *Attorney, Agent, or Firm* — Holzer Patel Drennan

(57) ABSTRACT

Clickable trackpad designs generally aim to achieve a thin form factor with a minimized footprint that provides consistent user perception of click feel at scale within cost constraints. The clickable trackpad designs found herein adopt a mechanical depression mechanism that allows a user to register a click at any point on the trackpad surface with little variance in the depression force required to register the click. This provides a consistent click feel for the user. Further consistency of the click feel is achieved by establishing simultaneous travel of the entire trackpad surface, no matter where the click force is applied. This motion is a downward translation of the trackpad surface. An end user may press at any location of the trackpad surface to achieve a push button input (or click).

20 Claims, 7 Drawing Sheets

MECHANICAL FLEXURAL PARALLEL MOTION TRACKPAD

CROSS-REFERENCE TO RELATED APPLICATIONS

The present application claims benefit of priority to U.S. Provisional Patent Application No. 63/574,658, entitled "Mechanical Flexural Parallel Motion Trackpad," and filed on Apr. 4, 2024, which is specifically incorporated by reference herein for all that it discloses or teaches.

BACKGROUND

A trackpad (also referred to as a touchpad) is a pointing device featuring a tactile sensor that can detect the position and motion of a user's finger(s) on a sensing surface and convert the detected position and motion into a digital output. The digital output of the trackpad is input to an operating system, which in turn displays a position and motion of a cursor corresponding to the user's finger(s) on a display screen of a computing device. Some trackpads are "clickable" (also referred to as clickpads), which refers to an additional ability to detect a magnitude of force on or displacement of the sensing surface caused by the user's finger(s) and include force/displacement magnitude in the digital output.

SUMMARY

Implementations described and claimed herein address the foregoing problems by providing a clickable trackpad comprising a printed circuit board assembly (PCBA) and attached touch sensor, a switch to register a user depression of the touch sensor, a pair of flexure mechanisms, and one or more torsion bars. Each of the flexure mechanisms includes a pair of bonding pads, each of the bonding pads fixed to an underside of the PCBA; a pair of rotatable linkages, each of the rotatable linkages rotate in response to compression of an associated one of the flexure mechanisms; a transmission bar to rotationally link the rotatable linkages; and flexures connecting the bonding pads, rotatable linkages, and the transmission bar. The torsion bars rotationally link the flexure mechanisms. A combination of the flexure mechanisms and the switch defines an activation threshold force and a release threshold force for the touch sensor.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTION

Figure 1:
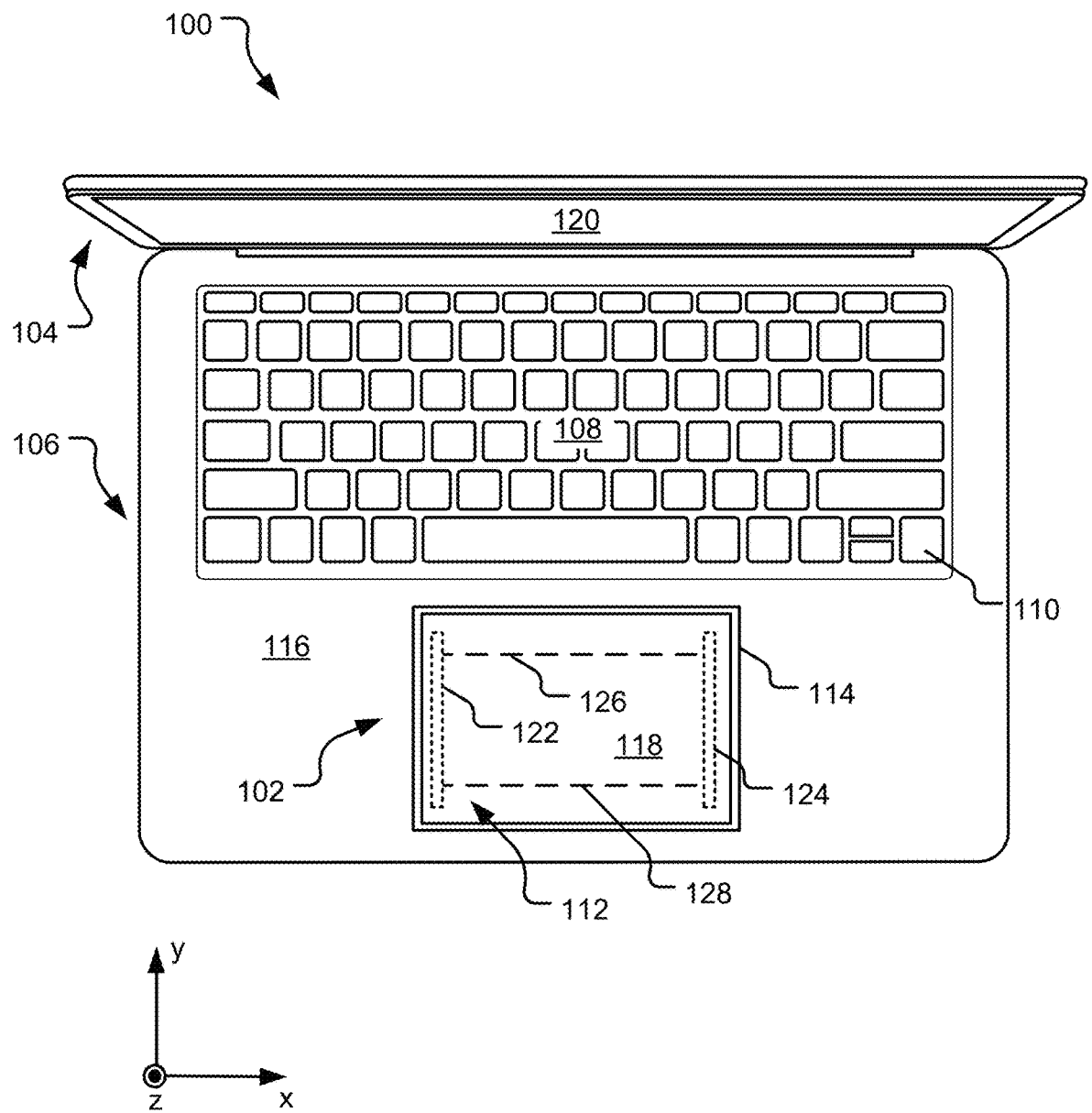
FIG. 1 illustrates a perspective view of a mobile computing device including an example mechanical flexural parallel motion trackpad with an underlying flexural parallel motion mechanism for enforcing linear depression of the mechanical flexural parallel motion trackpad with reference to its receiving aperture.

Mobile computing devices, such as smartphones, tablet computers, and laptop computers often incorporate one or more trackpads as user input devices. Clickable trackpads have a mechanical switch coupled to the trackpad surface, so there is clear tactile feedback when the user applies enough force to generate a "click," i.e., the trackpad "sinks" slightly to actuate the switch. Many clickable trackpads adopt a mechanical hinged mechanism, which generally allows for a consistent force to generate a click in the lower third of the trackpad area (away from the mechanical hinged mechanism), but the force required to generate the click increases as the lever distance (or distance to the mechanical hinged mechanism) decreases. As a result, in areas of the trackpad surface near the mechanical hinged mechanism registering a click may be difficult, if not impossible. This can be a user experience issue as users expect a clickable trackpad to function as such across the entire area of the trackpad.

One option to address this issue is that the "click" may be determined by the amount of force the user is exerting on the trackpad without mechanical depression of the trackpad. Haptic tactile feedback is then generated by a haptics transducer that generates a brief vibration that mimics traditional tactile feedback of a mechanically depressible trackpad, resulting in a haptic trackpad. An associated operating system may utilize the force/displacement magnitude applied by the user's finger(s) to determine if the user intends to "click" the haptic trackpad in the detected position and with the detected motion of the user's finger(s). Some haptic trackpads combine a limited physical stroke of the trackpad with a haptic response to provide feedback to a user, for example, by indicating that sufficient force has been detected by the trackpad to register a "click," with or without the physical stroke of the trackpad.

With haptic trackpads, physical motion of the touch area is supplemented or replaced by haptic feedback when contact pressure conditions are met. This approach offers the advantage of allowing users to execute clicks at any location on the trackpad, which is confirmed by the haptic feedback. This may also reduce the overall height of the trackpad assembly by minimizing or eliminating the mechanical hinged mechanism. However, implementing haptic feedback tends to increase the cost of the trackpads, which may not be acceptable in some implementations. Clickable trackpads, whether physically stroking to register a click and/or providing haptic feedback to register a click, are optimized for accurate user perception of the click but account for very limited vertical room for the trackpad assembly to occupy and cost of the trackpad assembly.

Clickable trackpad designs generally aim to achieve a thin form factor with a minimized footprint that provides consistent user perception of click feel at scale within cost constraints. The presently disclosed clickable trackpad designs adopt a mechanical system and method that effectively and efficiently addresses drawbacks and issues commonly encountered with prior approaches and systems, as discussed above and is functional within space limitations typical of mobile computing devices. Specifically, the clickable trackpad designs found herein adopt a mechanical depression mechanism that allows a user to register a click at any point on the trackpad surface with little variance in the depression force required to register the click. This provides a consistent click feel for the user. Consistency of the click feel is achieved by establishing simultaneous travel of the entire trackpad surface, no matter where the click force is applied. This motion is a downward translation of the trackpad surface. An end user may press at any location of the trackpad surface to achieve a push button input (or click).

More specifically, a user press on the trackpad surface actuates a linkage mechanism underneath the trackpad surface. This mechanism is constructed of a series of joints and bars, connected in such a way that parallel movement of the whole trackpad surface is obtained regardless of the location of the user's application of force on the trackpad surface. Thus, mechanical feedback provided via the trackpad surface is substantially the same for any location of the trackpad. Click events happen once the trackpad surface is depressed sufficiently to overcome the resistance provided by an associated dome switch and the linkage mechanism. An automatic return to a steady state "un-clicked" position occurs due to the upward force from the dome switch and the linkage mechanism underlying the trackpad surface.

Parallel movement or motion or substantially parallel movement or motion as used herein means sufficiently parallel movement to achieve the performance benefits described herein and yield a perception of uniform motion of the trackpad surface by the end user at any location on the trackpad surface. In some implementations, uniformity of the motion of the trackpad surface may vary by as much as 10% or 25% and still be considered parallel movement. Similarly, use of the same movement or substantially the same movement herein should be given a similar tolerance in meaning for similar reasons. Further, parallel/perpendicular structures or mechanisms or substantially parallel/perpendicular structures or mechanisms include such structures or mechanisms that are not exactly parallel due to packaging constraints, manufacturing tolerances, etc. Thus, such structures or mechanisms may vary as much as 10% from parallel or perpendicular and still be considered parallel or perpendicular.

The described mechanical flexural parallel motion trackpad may provide a number of technical advantages over prior art trackpad designs. Specifically, mechanical flexural parallel motion trackpads provide a uniform push button feel for a downward press made across an entire surface of the trackpad. Further, mechanical feedback is provided to an end user with a repeatable and predictable feel. Still further, the push button feedback is provided without requiring expensive haptic devices. The mechanical flexural parallel motion trackpad is flexible in that it may be implemented as a separate module or assembled into a cavity in a mobile device. Thus, the mechanical flexural parallel motion trackpads may fit in existing spaces reserved for trackpad assemblies in mobile computing devices.

In various implementations, the mechanical flexural parallel motion trackpads described herein meet or exceed the following design attributes. The force-to-fire (i.e., the force required to register a click) is approximately 150 grams-force or falls within a 100-300 grams-force range. A click ratio (i.eg., the ratio of the force-to-fire and the force that the mechanical flexural parallel motion trackpad gives immediately after a successful click) is approximately 0.58 or within a 0.40-0.80 range. Trackpad travel to register a click is approximately 0.2 mm or 0.1 mm-0.4 mm. Applied force uniformity across the trackpad surface sufficient to register a click varies by less than 25% or less than 10%. The total height occupied by the mechanical flexural parallel motion trackpad is less than 2.4 mm.

XYZ coordinates are shown and described below to illustrate directional features of the disclosed technology. Other coordinate systems may also be used with different orientations with similar effects. The descriptions of motion aligned in XYZ coordinate directions that follow are intended to be approximate as an application of force may not be aligned exactly in XYZ coordinate directions, and resisting forces may be not aligned exactly in XYZ coordinate directions. Further, manufacturing tolerances may vary the actual movement of the disclosed technology from XYZ coordinate directions. Thus, all of the following descriptions of movement of the disclosed technology with reference to XYZ coordinate directions or logical directions (e.g., up, down, across) are offered as examples only and intended to be approximate.

FIG. 1 illustrates a perspective view of a mobile computing device 100 including an example mechanical flexural parallel motion trackpad 102 with an underlying flexural parallel motion mechanism 112 for enforcing linear depression of the mechanical flexural parallel motion trackpad 102 with reference to its receiving aperture 114. The mobile computing device 100 includes a display portion 104 hingedly connected to a keyboard portion 106. The display portion 104 includes a display 120 and the keyboard portion 106 includes a keypad 108 and the flexural parallel motion trackpad 102 mounted within device chassis (or frame) 116. The keypad 108 contains an array of keys (e.g., key 110) arranged in a predetermined pattern (e.g., QWERTY). Each key within the keypad 108 may be communicatively connected to the mobile computing device 100. The flexural parallel motion trackpad 102 (also referred to herein as a touchpad or mousepad) converts physical user inputs into corresponding electrical signals that may be interpreted by the mobile computing device 100.

The flexural parallel motion trackpad 102 includes at least a printed circuit board assembly (PCBA) with an associated touch sensor (also referred to as a touch glass or simply glass) attached or adhered to the depicted top side of the PCBA. The flexural parallel motion trackpad 102 is oriented within the receiving aperture 114 in the device chassis 116. The PCBA/touch sensor 118 is suspended above a trackpad frame (not shown, see e.g., trackpad frame 660 of FIG. 6) using a pair of flexural parallel motion springs 122, 124 (illustrated in dotted lines as they are hidden by the touch sensor 118) and associated torsion bars 126, 128 (also illustrated in dashed lines as they are also hidden by the touch sensor 118).

The flexural parallel motion mechanism 112, including the flexural parallel motion springs 122, 124 and the associated torsion bars 126, 128 allows for the user to register a click at any point on the touch sensor 118 with little variance in the depression force required to register the click. This provides a consistent click feel for the user. Consistency of the click feel is achieved by establishing simultaneous travel of the entire touch sensor 118, no matter where the click force is applied. This motion is a downward translation of the touch sensor 118 in the negative z-direction. As a result, the user may press at any location of the touch sensor 118 to achieve a push button input (or click).

The touch sensor 118 is capable of physical downward translation in the negative z-direction in response to a user's compressive input at any point on the touch sensor 118. If the magnitude of the user's compressive input is sufficient to overcome a combined resisting spring force applied by the flexural parallel motion mechanism 112 and an underlying dome switch (not shown, see e.g., dome switch 256 of FIGS. 2A and 2B, or other switch styles), referred to herein as an activation threshold, the dome switch is actuated to indicate that the user has "clicked" the flexural parallel motion trackpad 102. When the user releases a sufficient amount of the compressive input referred to herein as a release threshold, the touch sensor 118 rebounds to its original position. The activation and release thresholds are defined by the intrinsic resilience of the flexural parallel motion mechanism 112, as well as the resisting spring force applied by the dome switch. The resilience of the flexural parallel motion mechanism 112 is technically advantageous in that it does not rely on the dome switch exclusively to provide desired rebound characteristics to the flexural parallel motion trackpad 102. Further, the resilience of the flexural parallel motion mechanism 112 replaces what may otherwise be a separate spring mechanism that is less desirable as it adds components and complexity to the design of the flexural parallel motion trackpad 102.

In various implementations, depending upon the computing device type and construction, the device chassis 116 may be a device bucket or mid-frame, which serves as a structural framework for the mobile computing device 100 and a surround for the flexural parallel motion trackpad 102. In various implementations, the mobile computing device 100 may be a tablet computer, a laptop computer, a personal computer, a gaming device, a smartphone, or any other discrete mobile device that carries out one or more specific sets of arithmetic and/or logical operations. The flexural parallel motion trackpad 102 may further be applied to vehicles (e.g., automobiles, watercraft, and aircraft), consumer electronics (e.g., cameras, telephones, and home appliances), and industrial or commercial machinery, with or without the mobile computing device 100. In other implementations, the flexural parallel motion trackpad 102 may be applied to a stand-alone trackpad or a cover (e.g., a type cover), with or without the mobile computing device 100 connected thereto.

Various aspects of the flexural parallel motion trackpad 102 (e.g., the flexural parallel motion springs 122, 124 and the associated torsion bars 126, 128) are depicted in broken lines in FIG. 1. These features would not normally be visible from an exterior of the mobile computing device 100 and/or may appear far different from the depictions in FIG. 1 but are nonetheless shown to illustrate the disclosed technology.

Figure 2A:
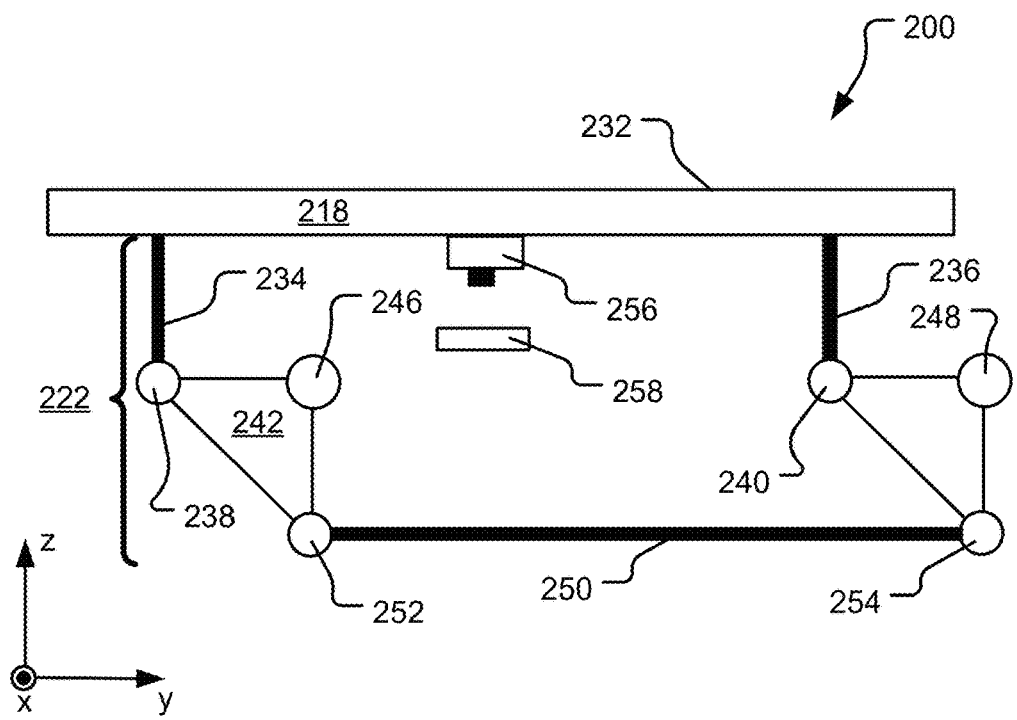
FIG. 2A is a functional diagram of an example flexural parallel motion mechanism and attached touch sensor in an un-actuated state.

FIG. 2A is a functional diagram 200 of an example flexural parallel motion mechanism 222 and attached touch sensor 218 according to the presently disclosed technology in an un-actuated state. The touch sensor 218 is suspended above a trackpad frame (not shown, see e.g., trackpad frame 660 of FIG. 6) using a pair of flexural parallel motion mechanisms, one of which (i.e., mechanism 222) is illustrated in FIG. 2A. The other flexural parallel motion mechanism suspending the touch sensor 218 is conceptually behind the negative x-direction in FIG. 2A and thus not illustrated in FIG. 2A. The flexural parallel motion mechanisms are connected using torsion bars (not shown, see e.g., torsion bars 526, 528 of FIG. 5. The disclosed flexural parallel motion mechanism 222 is based on a parallel motion mechanism, which provides translational motion without any linear guides required.

The flexural parallel motion mechanism 222, working in conjunction with the other flexural parallel motion mechanism and the torsion bars allows for the user to register a click at any point on the touch sensor 218 with little variance in the depression force required to register the click. This provides a consistent click feel for the user. Further consistency of the click feel is achieved by establishing simultaneous travel of the entire touch sensor 218, no matter where the click force is applied. This motion is a downward translation of the touch sensor 218 in the negative z-direction. As a result, the user may press at any location of the touch sensor 218 to achieve a push button input (or click).

Figure 2B:
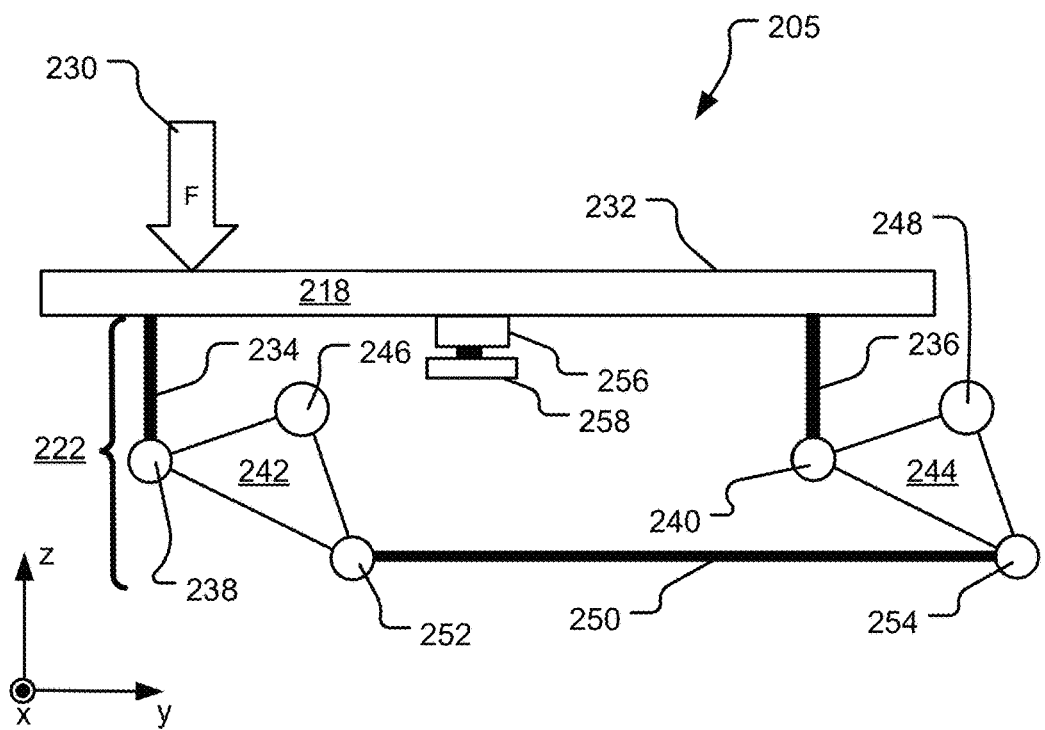
FIG. 2B is a functional diagram of the flexural parallel motion mechanism and attached touch sensor of FIG. 2A in an actuated state.

FIG. 2B is a functional diagram 205 of the flexural parallel motion mechanism 222 and attached touch sensor 218 of FIG. 2A in an actuated state. The user applies Force (F) 230 to depress the touch sensor 218 and actuate an associated flexural parallel motion trackpad (not shown, see e.g., trackpad 102 of FIG. 1). The Force (F) 230 may be applied anywhere on the top-facing touch surface 232 of the touch sensor 218 to depress vertical links 234, 236 downward (in the negative z-direction). The vertical links 234, 236 are connected to moveable joints 238, 240, respectively. This coordinated linear movement of the vertical links 234, 236 rotates rigid bodies 242, 244 about fixed joints 246, 248. Rotation of one of the rigid bodies 242, 244 pushes or pulls on horizontal link 250 connected via moveable joints 252, 254. On the opposing side, the horizontal link 250 will push or pull on the other of the rigid bodies 242, 244, which in turn pulls down the touch sensor 218. Both sides of the touch sensor 218 are mechanically interconnected and perform substantially the same movement in the z-direction resulting in translation of the whole touch sensor 218.

In other words, the flexural parallel motion mechanism 222 converts vertical (z-direction) motion of the touch sensor 218 to horizontal (y-direction) motion of the horizontal link 250 and then back to vertical (z-direction) motion of the touch sensor 218. A technical benefit of the disclosed mechanism 222 and associated components is that force applied to the touch sensor 218 in the negative z-direction yields parallel movement of the touch sensor 218 regardless of where a user applies force on the top-facing touch surface 232. This yields benefits in allowing a user to register a click anywhere on the touch surface 232 with a uniform perceived application of force and resulting movement of the touch surface 232.

This foregoing motion of the touch sensor 218 in the negative z-direction triggers dome switch 256 to depress against a fixed surface 258, but actuation of the dome switch 256 is not dependent on the location where Force (F) 230 is applied to the touch sensor 218. The single dome switch 256 provides reliable and repeatable mechanical functionality by its design while providing a whole or portion of a force that returns the flexural parallel motion mechanism 222 and associated components of a trackpad to an un-actuated state. Other switch mechanisms are contemplated herein as well, including those that do not provide a spring force.

The touch sensor 218 is capable of physical downward translation in the z-direction in response to a user's compressive input at any point on the touch sensor 218, as discussed above. If the magnitude of the user's compressive input is sufficient to overcome a combined resisting spring force applied by the flexural parallel motion mechanism 222 and associated components of a trackpad, including the underlying dome switch 256 (or other switch styles), the dome switch 256 is actuated to indicate that the user has "clicked" the trackpad. When the user releases the compressive input, the touch sensor 218 rebounds to its original "un-clicked" position.

Figure 3:
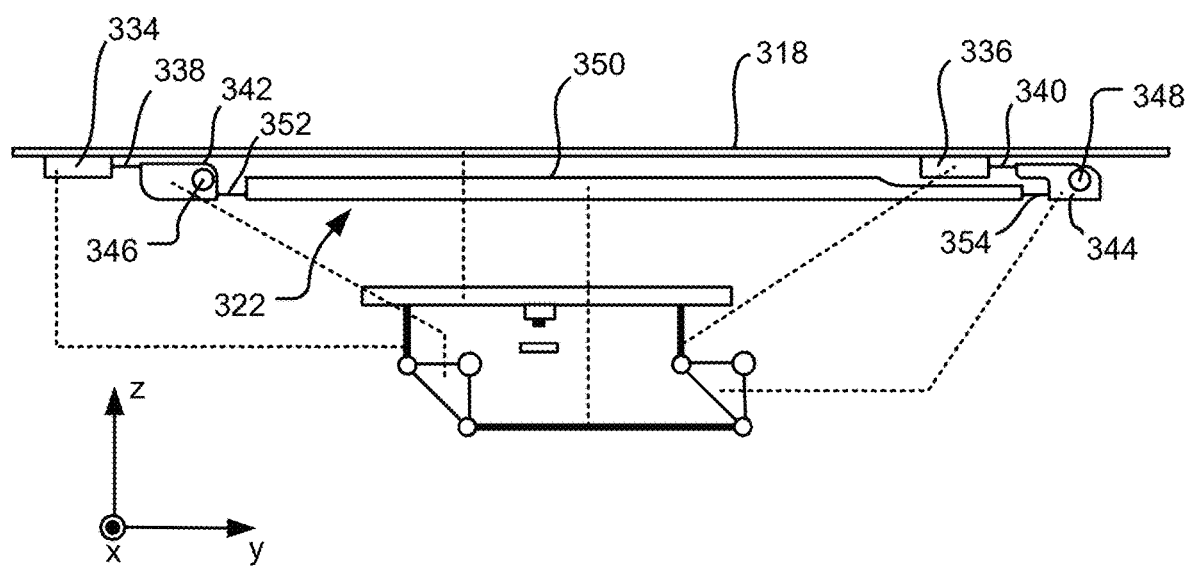
FIG. 3 illustrates an elevation view of an example flexural parallel motion spring in an un-actuated state mapped to the functional diagram of FIG. 2A.

FIG. 3 illustrates an elevation view of an example flexural parallel motion spring 322 in an un-actuated state mapped to the functional diagram 200 of FIG. 2A. While the spring 322 is functionally similar to the mechanism 222 of FIG. 2A, the spring 322 is adapted to meet manufacturability, cost, and packaging requirements that would be difficult, if not impossible, to meet with the mechanism 222. The mapping is illustrated using broken lines to functionally associate components of the mechanism 222 with components of the spring 322. The flexure design of the spring 322 imparts an intrinsic spring ratio thereto, which is not present in the mechanism 222. This spring ratio may be useful in the functionality of an associated trackpad (e.g., trackpad 102 of FIG. 1). As a result, the spring 322 may be created from a single compliant part that mimics the mechanism 222 with moveable joints being replaced by flexures and rigid bodies 242, 244 being replaced by pivot blocks 342, 344, as discussed in further detail below.

The spring 322 generally functions by permitting large elastic deformation in specific segments defined by material thickness. By creating thin sections, the bending performance of the spring 322 can be tuned in specific locations and about specific axes, and by creating thick sections, the spring 322 can be very stiff in those locations. As compared to the mechanism 222 that uses numerous components, including links, rigid bodies, hinges, pivots, bearings, and the like, the spring 322 is a singular moving part with no backlash introduced by manufacturing tolerances between the distinct parts found in the mechanism 222.

Like touch sensor 218 of FIG. 2A, touch sensor 318 is suspended above a trackpad frame (not shown, see e.g., trackpad frame 660 of FIG. 6) using a pair of flexural parallel motion springs, one of which (i.e., spring 322) is illustrated in FIG. 3. The other flexural parallel motion spring suspending the touch sensor 318 is conceptually behind the negative x-direction in FIG. 3, and thus not shown. The flexural parallel motion springs are connected using torsion bars (not shown, see e.g., torsion bars 526, 528 of FIG. 5).

The flexural parallel motion spring 322, working in conjunction with the other flexural parallel motion spring and the torsion bars allows for the user to register a click at any point on the touch sensor 318 with little variance in the depression force required to register the click. This provides a consistent click feel for the user. Further consistency of the click feel is achieved by establishing simultaneous travel of the entire touch sensor 318, no matter where the click force is applied. This motion is a downward translation of the touch sensor 318 in the negative z-direction. As a result, the user may press at any location of the touch sensor 318 to achieve a push button input (or click).

Bonding pads 334, 336 are akin to vertical links 234, 236 of FIG. 2A. The bonding pads 334, 336 are adhered to an underside of the touch sensor 218 and connected to flexures 338, 340 (akin to moveable joints 238, 240 of FIG. 2A), respectively. Coordinated linear movement of the bonding pads 334, 336 rotates pivot blocks 342, 344 (akin to rigid bodies 242, 244 of FIGS. 2A) about torsion bars 346, 348 running in the x-direction (akin to fixed joints 246, 248 of FIG. 2A). Rotation of one of the pivot blocks 342, 344 pushes or pulls on transmission bar 350 (akin to horizontal link 250 of FIG. 2A) connected via flexures 352, 354 (akin to moveable joints 252, 254 of FIG. 2A). On the opposing side, the transmission bar 350 will push or pull on the other of the pivot blocks 342, 344, which in turn pulls down the touch sensor 318. Both sides of the touch sensor 318 are mechanically interconnected and perform substantially the same movement in the z-direction resulting in translation of the whole touch sensor 318, similar to that described above with reference to FIG. 2B and described below with reference to FIG. 4.

The spring 322 is capable of physical downward translation in the negative z-direction in response to a user's compressive input at any point on the touch sensor 318, as discussed above. If the magnitude of the user's compressive input is sufficient to overcome a combined resisting spring force applied by the spring 322 and associated components, including an underlying dome switch (or other switch style), the switch is actuated to indicate that the user has "clicked" the trackpad. When the user releases the compressive input, the touch sensor 318 rebounds to its original "un-clicked" position due to the intrinsic resilience of the spring 322 and associated components, including the resisting spring force applied by the switch.

Figure 4:
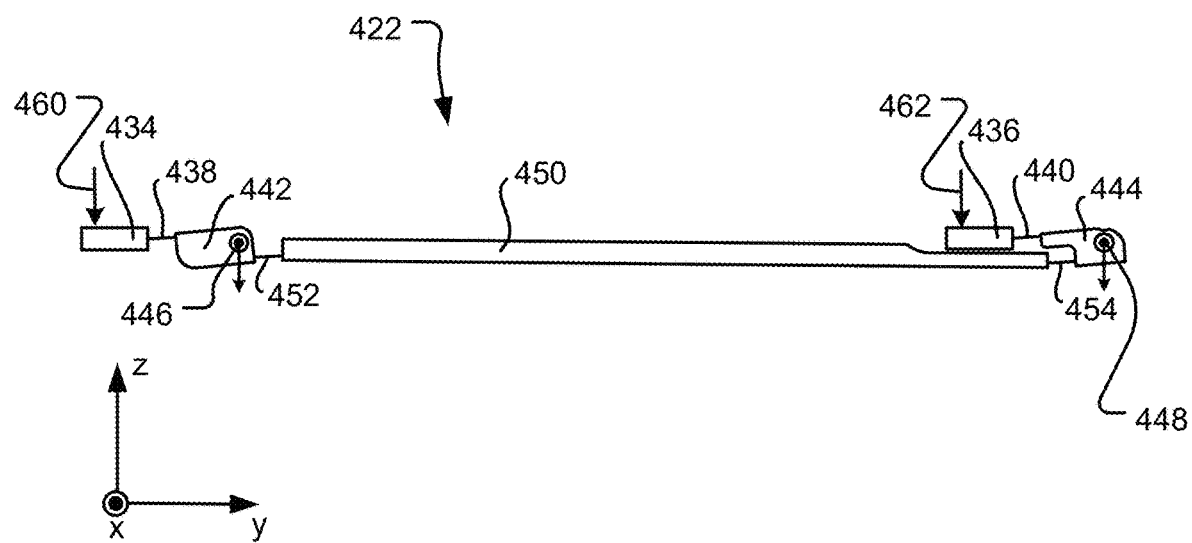
FIG. 4 illustrates an elevation view of an example flexural parallel motion spring in an actuated state.

FIG. 4 illustrates an elevation view of an example flexural parallel motion spring 422 in an actuated state. The user applies Force (F) (not shown, see e.g., Force (F) 230 of FIG. 2B) to depress an associated touch sensor (also not shown, see e.g., touch sensor 318 of FIG. 3) and actuate an associated flexural parallel motion trackpad (not shown, see e.g., trackpad 102 of FIG. 1). The Force (F) may be applied anywhere on the top-facing touch surface of the touch sensor and is transmitted to bonding pads 434, 436, as illustrated by arrows 460, 462 that depress downward (in the negative z-direction). The Force (F) transmitted to the bonding pad 434 versus the bonding pad 436 will vary proportionally based on where the user applies the Force (F) on the touch sensor, though the sum of the Force (F) applied by the user is equal to the sum of the force applied on the bonding pads 434, 436, and any other bonding pads present in the associated flexural parallel motion trackpad.

The bonding pads 434, 436 are connected to flexures 438, 440, respectively. This coordinated linear movement of the bonding pads 434, 436 rotates pivot blocks 442, 444 about torsion bars 446, 448 running in the x-direction. Rotation of one of the pivot blocks 442, 444 pushes or pulls on transmission bar 450 connected via flexures 452, 454. On the opposing side, the transmission bar 450 will push or pull on the other of the pivot blocks 442, 444, which in turn pulls down the bonding pads 434, 436. Rotation of the pivot blocks 442, 444 may further drive rotation of connected torsion bars (not shown, see e.g., torsion bars 526, 528 of FIG. 5, discussed below). The torsion bars connect the flexural parallel motion spring 422 to another similar flexural parallel motion spring 422 at an opposite end of the touch sensor. As a result, both sides of the touch sensor are mechanically interconnected and perform substantially the same movement in the z-direction resulting in equal z-direction translation of the bonding pads 434, 436, and any other bonding pads present in the associated flexural parallel motion trackpad, and of the whole touch sensor.

In various implementations, the spring 422 is of a plastic, metal alloy, and/or composite metal/plastic construction. For a purely metal alloy construction, the spring 422 may be folded upward to create angled or boxed sections to achieve the areas of increased thickness or cross-sectional area and dimensions (e.g., the pivot blocks 442, 444, and transmission bar 450) and otherwise not folded to create the flexures 438, 440, 452, 454 from a continuous piece of thin metal. For a purely plastic construction, the spring 422 may be molded to create individual springs or extruded and cut from the extrusion to create individual springs, for example. For a hybrid construction, the metal alloy in the form of a continuous leaf spring that is primarily used for the flexures 438, 440, 452, 454, and plastic is attached (e.g., pressed, glued, or welded on) or molded to the metal leaf spring to create the areas of increased thickness (e.g., the pivot blocks 442, 444 and transmission bar 450). Regardless, the spring 422 may be designed for a life of 1-3 million cycles. For the flexures 438, 440, 452, 454 to meet that design specification, while maintaining resiliency through the device life, the flexures 438, 440, 452, 454 may be of a metal alloy, but the remainder of the spring 422 that does not flex can include over molded or attached plastic. The continuous construction with areas of varying thickness construction of the spring 422 is technically advantageous in that it achieves a disparate performance of the various portions of the spring 422 akin to separate parts but with the advantage of the spring 422 being a singular continuous piece or having fewer pieces that it would be otherwise. This reduces the complexity of manufacturing and yields fewer points of potential failure.

Figure 5:
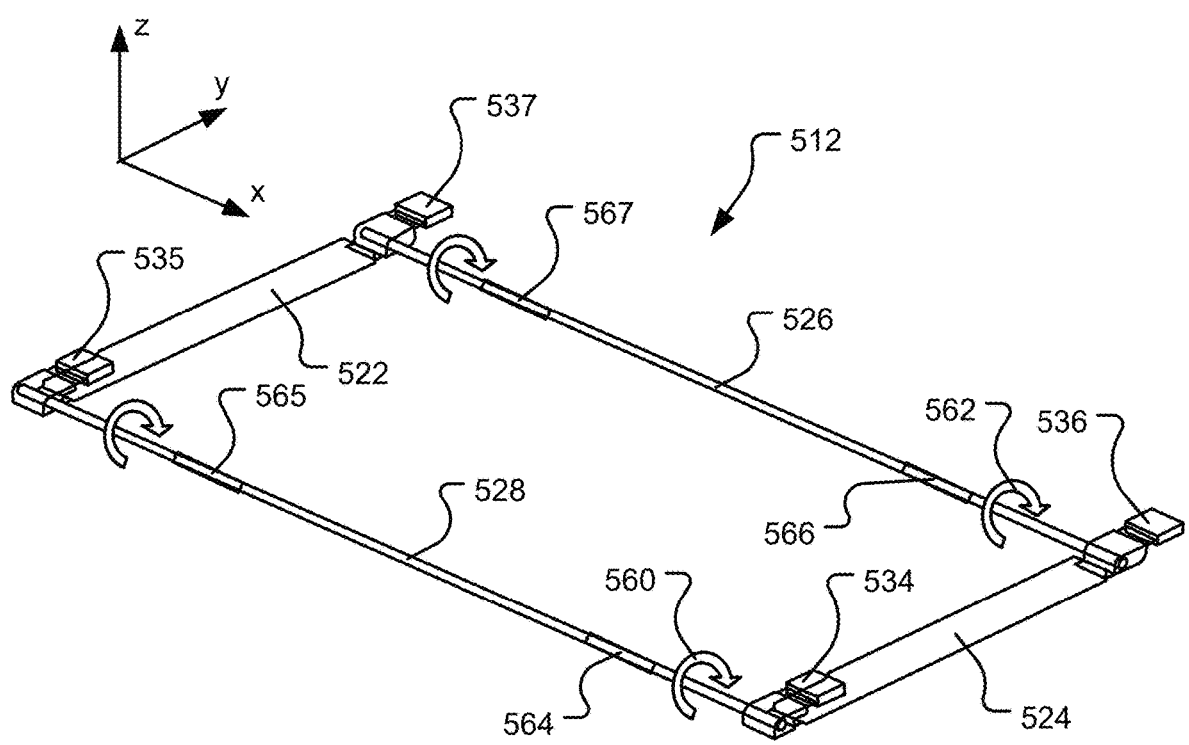
FIG. 5 illustrates a perspective view of a pair of example flexural parallel motion springs and a pair of connected torsion bars.

FIG. 5 illustrates a perspective view of a flexural parallel motion mechanism 512 including a pair of example flexural parallel motion springs 522, 524 connected via a pair of connected torsion bars 526, 528. The springs 522, 524 are illustrated as transparent to show the connection of the torsion bars 526, 528 thereto. The flexural parallel motion mechanism 512 allows the user to register a click at any point on an associated touch sensor with little variance in the depression force required to register the click. This provides a consistent click feel for the user. Consistency of the click feel is achieved by establishing simultaneous travel of the entire touch sensor, which is connected to the flexural parallel motion mechanism 512 via bonding pads 534, 535, 536, 537, no matter where the click force is applied. This motion yields a downward translation of the bonding pads 534, 535, 536, 537 in the negative z-direction, compression of the flexural parallel motion springs 522, 524 in the negative z-direction, and rotation of the torsion bars 526, 528 as illustrated by the depicted arrows (e.g., arrows 560, 562).

The touch sensor is suspended above a trackpad frame (not shown, see e.g., trackpad frame 660 of FIG. 6) using the flexural parallel motion mechanism 512, which seats to the trackpad frame at bearings 564, 565, 566, 567. The bearings 564, 565, 566, 567 prevent the flexural parallel motion mechanism 512 from deflecting in the negative z-direction, but permit the axial rotation illustrated by the depicted arrows. The bars 526, 528 are fixed linearly and rotationally to the flexural parallel motion springs 522, 524 such that the bars 526, 528 are not permitted to move with reference to their respective seats within the flexural parallel motion springs 522, 524. As a result, deflection of one of the springs 522, 524 in the negative z-direction causes rotation of both bars 526, 528, which is carried down the length of the bars 526, 528 to the other of the springs 522, 524 and drives a similar z-direction deflection of the other of the springs 522, 524.

In other implementations, the bars 526, 528 may be replaced with additional springs akin to springs 522, 524, but running in the x-direction similar to the bars 526, 528 (perpendicular to the springs 522, 524). In such implementations, the springs 522, 524 may or may not be directly connected to the additional springs that drive linear motion of the touch sensor.

Figure 6:
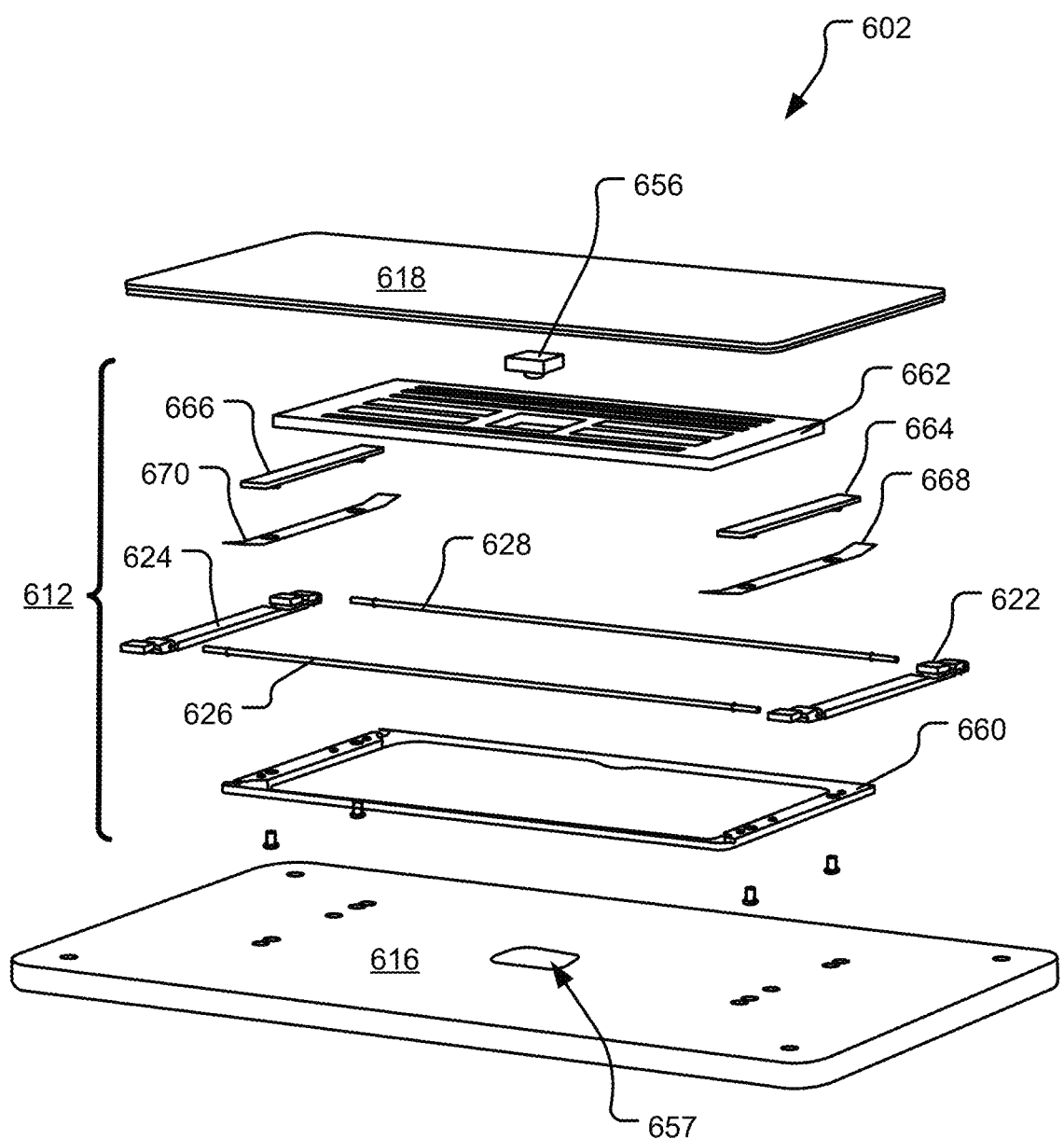
FIG. 6 illustrates an exploded perspective view of an example mechanical flexural parallel motion trackpad.

FIG. 6 illustrates an exploded perspective view of an example mechanical flexural parallel motion trackpad 602. The trackpad 602 includes a printed circuit board assembly with an associated touch sensor attached or adhered to the top side of the PCBA/touch sensor 618 with an underlying flexural parallel motion mechanism 612 for enforcing linear depression of the trackpad 602 with reference to a receiving assembly 616 (e.g., a device chassis). The PCBA/touch sensor 618 detects the location, size, and motion of a user's touch inputs on the touch sensor and the PCB converts the location, size, and motion of the user's touch inputs into an electronic signal that can be interpreted by a computing device. The PCBA/touch sensor 618 may utilize capacitive or resistive technology for sensing the user's touch inputs through the touch sensor, as examples.

The PCBA/touch sensor 618 includes a plate stiffener 662 (e.g., a carbon sheet for its high rigidity per unit of mass) that serves to ensure that the PCBA/touch sensor 618 stays substantially planar regardless of the point a user may apply pressure thereto. In other implementations, the plate stiffener 662 is omitted as the PCBA/touch sensor 618 is deemed sufficiently stiff to remain substantially planar under expected load conditions.

The PCBA/touch sensor 618 is suspended above a trackpad frame 660 using a pair of flexural parallel motion springs 622, 624 and associated torsion bars 626, 628. The flexural parallel motion springs 622, 624 and the associated torsion bars 626, 628 allow for a user to register a click at any point on the PCBA/touch sensor 618 with little variance in the depression force required to register the click. This provides a consistent click feel for the user. Consistency of the click feel is achieved by establishing simultaneous travel of the entire PCBA/touch sensor 618, no matter where the click force is applied. This motion is a downward translation of the PCBA/touch sensor 618. As a result, the user may press at any location of the PCBA/touch sensor 618 to achieve a push button input (or click).

If the magnitude of the user's compressive input is sufficient to overcome a combined resisting spring force applied by the flexural parallel motion mechanism 612 and an underlying dome switch 656, the dome switch 656 is pressed against switch seat 657 on the receiving assembly 616 and actuated to indicate that the user has registered a click. When the user releases the compressive input, the PCBA/touch sensor 618 rebounds to its original un-clicked position due to the intrinsic resilience of the flexural parallel motion mechanism 612, as well as the resisting spring force applied by the dome switch 656. In other implementations, the switch seat 657 is adapted into the trackpad frame 660 in lieu of the receiving assembly 616. Further, the dome switch 656 may be incorporated into the trackpad frame 660 or the receiving assembly 616 and the switch seat 657 is a part of the touch sensor 618.

The torsion bars 626, 628 rest in grooves in the trackpad frame 660 that function as seats for the torsion bars 626, 628 permitting the torsion bars 626, 628 to rotate within the grooves. The torsion bars 626, 628 are secured in place within the grooves by brackets 664, 666 and associated springs 668, 670 that apply a sufficient compressive force to keep the torsion bars 626, 628 seated within the grooves, but insufficient force to prevent the torsion bars 626, 628 from rotating within the grooves. The grooves combined with the brackets 664, 666, and associated springs 668, 670 provide a simple and elegant solution for securing the torsion bars 626, 628 against translational motion, but still permitting rotation. Roller or needle bearings are also contemplated herein and would achieve a similar effect. The grooves combined with the brackets 664, 666 and associated springs 668, 670 is a technically advantageous solution in that it is less complex than roller or needle bearings and may require less z-direction thickness than roller or needle bearings.

The springs 622, 624 provide compliance and suspend the PCBA/touch sensor 618 above the trackpad frame 660 and receiving assembly 616 (e.g., a device chassis). While the springs 622, 624 suspend PCBA/touch sensor 618, they also generally keep the PCBA/touch sensor 618 centered. In various implementations, the springs 622, 624 are of a plastic, metal alloy, and/or composite metal/plastic construction. While a pair of springs 622, 624, and a pair of torsion bars 626, 628 are depicted, in other implementations greater or fewer springs and torsion bars may be used.

Figure 7A:
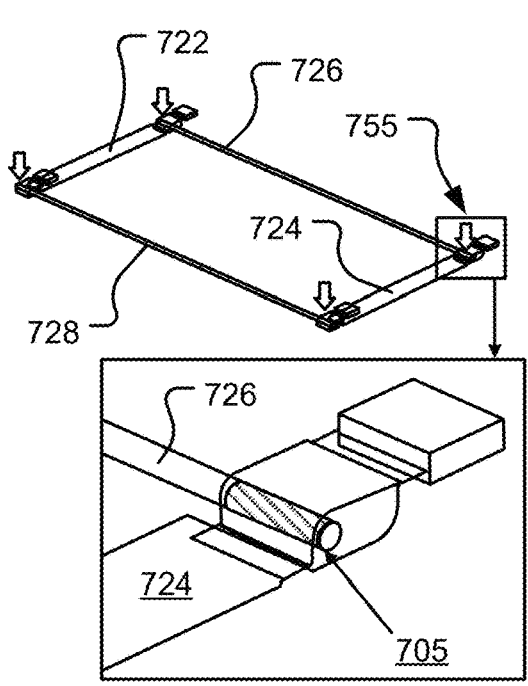
FIG. 7A illustrates rigid connections between flexural parallel motion springs and associated torsion bars for a mechanical flexural parallel motion trackpad and a detailed view thereof.

FIG. 7A illustrates rigid connections (e.g., fixed connection 705) between flexural parallel motion springs 722, 724 and associated torsion bars 726, 728 for a mechanical flexural parallel motion trackpad and a detail view 755 thereof. The bars 726, 728 are fixed linearly and rotationally to the flexural parallel motion springs 722, 724 at four downwardly-directed arrows such that the bars 726, 728 are not permitted to move with reference to their respective seats within the flexural parallel motion springs 722, 724. In various implementations, the fixed connections (e.g., fixed connection 705 shown in the detail view 755) may be achieved via press-fit, weld, solder, keyed shaft/wrist pin, etc.

Figure 7B:
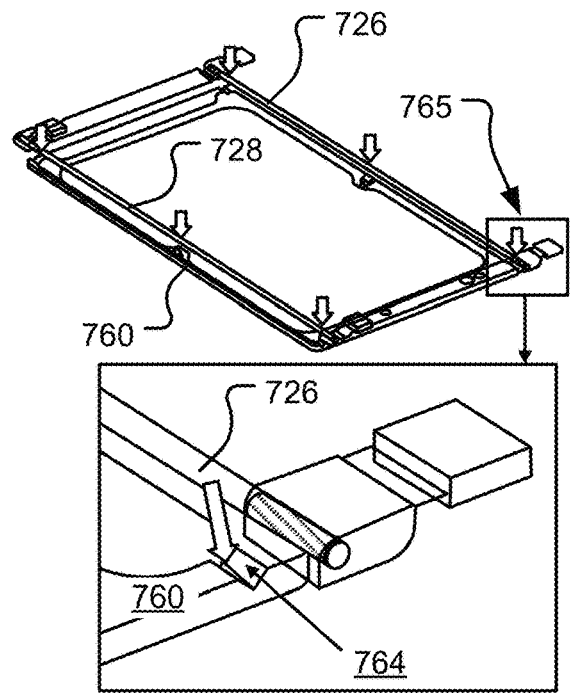
FIG. 7B illustrates rotatable connections between torsion bars and an underlying trackpad frame for a mechanical flexural parallel motion trackpad and a detailed view thereof.

FIG. 7B illustrates rotatable connections (e.g., v-groove bearing 764) between torsion bars 726, 728 and an underlying trackpad frame 760 for a mechanical flexural parallel motion trackpad and a detail view 765 thereof. V-groove bearings (e.g., v-groove bearing 764 shown in the detail view 765) are present on the trackpad frame 760 at each of the six downwardly directed arrows. The v-groove bearings prevent the torsion bars 726, 728 from linear movement where they are secured to the trackpad frame 760 (in combination with brackets and springs, see e.g., bracket 766 and associated spring 734 of FIG. 7C), but permit the axial rotation of the torsion bars 726, 728 at the v-groove bearings. While a plain bearing is illustrated in the detail view 765 and described above, other implementations may utilize other bearing types that allow rotation but limit or prevent linear movement (e.g., roller bearings). In some implementations, the v-groove bearings may not sufficiently constrain axial motion of the torsion bars 726, 728. In those cases, the v-groove bearings may include shoulders or retaining rings to support incidental axial loads and constrain axial movement of the torsion bars 726, 728 with respect to the trackpad frame 760 (e.g., prevent axial sliding of the torsion bars 726, 728 in the v-groove bearings).

Figure 7C:
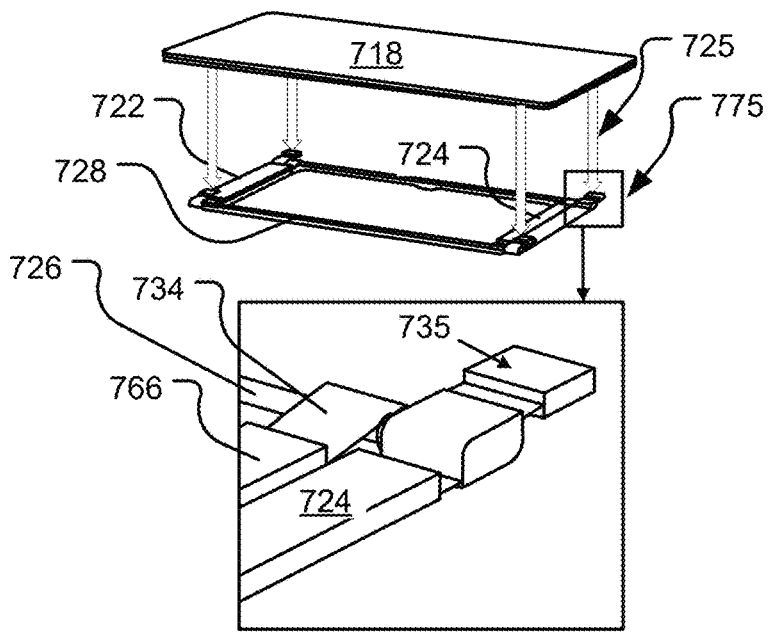
FIG. 7C illustrates fixed connections between bonding pads of flexural parallel motion springs and an overlying PCBA/trackpad for a mechanical flexural parallel motion trackpad and a detailed view thereof.

FIG. 7C illustrates fixed connections (e.g., connection 725) between bonding pads (e.g., bonding pad 735) of flexural parallel motion springs 722, 724 and an overlying PCBA/trackpad 718 for a mechanical flexural parallel motion trackpad and a detail view 775 thereof. The bonding pads adhere to an underside of the PCBA/trackpad 718 at each of four downwardly-directed arrows located generally at opposing corners of the overlying PCBA/trackpad 718. The bonding pads form part of opposing ends of each of flexural parallel motion springs 722, 724. Coordinated linear movement of the bonding pads deflects the springs 722, 724 and rotates the torsion bars 726, 728.

Implementations described herein include a clickable trackpad comprising a printed circuit board assembly (PCBA) and attached touch sensor, a switch to register a user depression of the touch sensor, a pair of flexure mechanisms, and one or more torsion bars to rotationally link the flexure mechanisms. A combination of the flexure mechanisms and the switch defines an activation threshold force for the touch sensor and a release threshold force for the touch sensor. Each of the flexure mechanisms includes a pair of bonding pads, each of the bonding pads fixed to an underside of the PCBA; a pair of rotatable linkages, each of the rotatable linkages to rotate in response to compression of an associated one of the flexure mechanisms; a transmission bar to rotationally link the rotatable linkages; and flexures connecting the bonding pads, rotatable linkages, and the transmission bar.

The clickable trackpad may further comprise a base frame that receives the torsion bars in bearing seats.

The clickable trackpad may further comprise one or more pairs of brackets and leaf springs that secure the torsion bars within the bearing seats.

The clickable trackpad may further comprise a carbon plate stiffener adhered to the PCBA.

The bonding pads, rotatable linkages, transmission bar, and flexures may be of a continuous piece of material with areas of differing cross-sectional dimensions defining the bonding pads, rotatable linkages, transmission bar, and flexures.

The flexure mechanisms may be each of a continuous piece of plastic or metal alloy.

The flexure mechanisms may be each of a composite plastic and metal alloy component.

The flexure mechanisms may be substantially parallel to one another.

The torsion bars may be oriented substantially perpendicular to the flexure mechanisms.

Implementations described herein further include a mobile computing device comprising a device chassis including a trackpad cavity and a clickable trackpad secured within the trackpad cavity. The clickable trackpad comprises a printed circuit board assembly (PCBA) and attached touch sensor, a switch to register a user depression of the touch sensor, a pair of flexure mechanisms, and one or more torsion bars to rotationally link the flexure mechanisms. A combination of the flexure mechanisms and the switch defines an activation threshold force for the touch sensor and a release threshold force for the touch sensor. Each of the flexure mechanisms includes a pair of bonding pads, each of the bonding pads fixed to an underside of the PCBA; a pair of rotatable linkages, each of the rotatable linkages to rotate in response to compression of an associated one of the flexure mechanisms; a transmission bar to rotationally link the rotatable linkages; and flexures connecting the bonding pads, rotatable linkages, and the transmission bar.

The clickable trackpad may further comprise a base frame that receives the torsion bars in bearing seats.

The clickable trackpad may further comprise one or more pairs of brackets and leaf springs that secure the torsion bars within the bearing seats.

The clickable trackpad may further comprises a carbon plate stiffener adhered to the PCBA.

The bonding pads, rotatable linkages, transmission bar, and flexures may be of a continuous piece of material with areas of differing cross-sectional dimensions defining the bonding pads, rotatable linkages, transmission bar, and flexures.

The flexure mechanisms may be each of a continuous piece of plastic or metal alloy.

The flexure mechanisms may be each of a composite plastic and metal alloy component.

The flexure mechanisms may be substantially parallel to one another.

The torsion bars may be oriented substantially perpendicular to the flexure mechanisms.

Implementations described herein further include a clickable trackpad comprising a printed circuit board assembly (PCBA) and attached touch sensor, a switch to register a user depression of the touch sensor, a first pair of flexure mechanisms, and a second pair of flexure mechanisms being approximately perpendicular to the first pair of flexure mechanisms. Each of the first pair of flexure mechanisms includes a first pair of bonding pads, each of the first pair of bonding pads fixed to an underside of the PCBA; a first pair of rotatable linkages, each of the first pair of rotatable linkages to rotate in response to compression of an associated one of the flexure mechanisms; a first transmission bar to rotationally link the first pair of rotatable linkages; and first flexures connecting the first pair of bonding pads, first pair of rotatable linkages, and the first transmission bar. Each of the second pair of flexure mechanisms includes a second pair of bonding pads, each of the second pair of bonding pads fixed to the underside of the PCBA; a second pair of rotatable linkages, each of the second pair of rotatable linkages to rotate in response to compression of an associated one of the second flexure mechanisms; a second transmission bar to rotationally link the second pair of rotatable linkages; and second flexures connecting the second pair of bonding pads, second pair of rotatable linkages, and the second transmission bar. A combination of the flexure mechanisms and the switch defines an activation threshold force for the touch sensor and a release threshold force for the touch sensor.

The first pair of flexure mechanisms may be oriented substantially perpendicular to the second pair of flexure mechanisms.

The above specification, examples, and data provide a complete description of the structure and use of exemplary embodiments of the presently disclosed technology. Since many embodiments can be made without departing from the spirit and scope of the forgoing disclosure, the scope is defined by the claims hereinafter appended and any equivalents thereto. Furthermore, structural features of the different embodiments may be combined in yet another embodiment without departing from the recited claims.

What is claimed is:

1. A clickable trackpad comprising:
   a printed circuit board assembly (PCBA) and attached touch sensor;
   a switch to register a user depression of the touch sensor;
   a pair of flexure mechanisms, each flexure mechanism including:
      a pair of bonding pads, each of the bonding pads fixed to an underside of the PCBA;
      a pair of rotatable linkages, each of the rotatable linkages to rotate in response to compression of an associated one of the flexure mechanisms;
      a transmission bar to rotationally link the rotatable linkages; and
      flexures connecting the bonding pads, rotatable linkages, and the transmission bar; and
   one or more torsion bars to rotationally link the flexure mechanisms, wherein a combination of the flexure mechanisms and the switch defines an activation threshold force for the touch sensor and a release threshold force for the touch sensor.

2. The clickable trackpad of claim 1, further comprising:
   a base frame that receives the torsion bars in bearing seats.

3. The clickable trackpad of claim 2, further comprising:
   one or more pairs of brackets and leaf springs that secure the torsion bars within the bearing seats.

4. The clickable trackpad of claim 1, further comprising:
   a carbon plate stiffener adhered to the PCBA.

5. The clickable trackpad of claim 1, wherein the bonding pads, rotatable linkages, transmission bar, and flexures are of a continuous piece of material with areas of differing cross-sectional dimensions defining the bonding pads, rotatable linkages, transmission bar, and flexures.

6. The clickable trackpad of claim 1, wherein the flexure mechanisms are each of a continuous piece of plastic or metal alloy.

7. The clickable trackpad of claim 1, wherein the flexure mechanisms are each of a composite plastic and metal alloy component.

8. The clickable trackpad of claim 1, wherein the flexure mechanisms are substantially parallel to one another.

9. The clickable trackpad of claim 1, wherein the torsion bars are oriented substantially perpendicular to the flexure mechanisms.

10. A mobile computing device comprising:
    a device chassis including a trackpad cavity; and
    a clickable trackpad secured within the trackpad cavity, the clickable trackpad comprising:
       a printed circuit board assembly (PCBA) and attached touch sensor;
       a switch to register a user depression of the touch sensor;
       a pair of flexure mechanisms, each flexure mechanism including:
          a pair of bonding pads, each of the bonding pads fixed to an underside of the PCBA;
          a pair of rotatable linkages, each of the rotatable linkages to rotate in response to compression of an associated one of the flexure mechanisms;
          a transmission bar to rotationally link the rotatable linkages; and
          flexures connecting the bonding pads, rotatable linkages, and the transmission bar; and
       one or more torsion bars to rotationally link the flexure mechanisms, wherein a combination of the flexure mechanisms and the switch defines an activation threshold force for the touch sensor and a release threshold force for the touch sensor.

11. The mobile computing device of claim 10, wherein the clickable trackpad further comprises:
    a base frame that receives the torsion bars in bearing seats.

12. The mobile computing device of claim 11, wherein the clickable trackpad further comprises:
    one or more pairs of brackets and leaf springs that secure the torsion bars within the bearing seats.

13. The mobile computing device of claim 10, wherein the clickable trackpad further comprises:
a carbon plate stiffener adhered to the PCBA.

14. The mobile computing device of claim 10, wherein the bonding pads, rotatable linkages, transmission bar, and flexures are of a continuous piece of material with areas of differing cross-sectional dimensions defining the bonding pads, rotatable linkages, transmission bar, and flexures.

15. The mobile computing device of claim 10, wherein the flexure mechanisms are each of a continuous piece of plastic or metal alloy.

16. The mobile computing device of claim 10, wherein the flexure mechanisms are each of a composite plastic and metal alloy component.

17. The mobile computing device of claim 10, wherein the flexure mechanisms are substantially parallel to one another.

18. The mobile computing device of claim 10, wherein the torsion bars are oriented substantially perpendicular to the flexure mechanisms.

19. A clickable trackpad comprising:
a printed circuit board assembly (PCBA) and attached touch sensor;
a switch to register a user depression of the touch sensor;
a first pair of flexure mechanisms, each of the first pair of flexure mechanisms including:
a first pair of bonding pads, each of the first pair of bonding pads fixed to an underside of the PCBA;
a first pair of rotatable linkages, each of the first pair of rotatable linkages to rotate in response to compression of an associated one of the flexure mechanisms;
a first transmission bar to rotationally link the first pair of rotatable linkages; and
first flexures connecting the first pair of bonding pads, first pair of rotatable linkages, and the first transmission bar; and
a second pair of flexure mechanisms, the second pair of flexure mechanisms being approximately perpendicular to the first pair of flexure mechanisms, each of the second pair of flexure mechanisms including:
a second pair of bonding pads, each of the second pair of bonding pads fixed to the underside of the PCBA;
a second pair of rotatable linkages, each of the second pair of rotatable linkages to rotate in response to compression of an associated one of the second flexure mechanisms;
a second transmission bar to rotationally link the second pair of rotatable linkages; and
second flexures connecting the second pair of bonding pads, second pair of rotatable linkages, and the second transmission bar, wherein a combination of the flexure mechanisms and the switch defines an activation threshold force for the touch sensor and a release threshold force for the touch sensor.

20. The clickable trackpad of claim 19, wherein the first pair of flexure mechanisms are oriented substantially perpendicular to the second pair of flexure mechanisms.

* * * * *